United States Patent
Derhammer (10) Patent No.: US 10,571,004 B2
(45) Date of Patent: Feb. 25, 2020

(54) VARIABLE-PITCH STATOR FOR TORQUE CONVERTER

(71) Applicant: SCHAEFFLER TECHNOLOGIES AG & CO. KG, Herzogenaurach (DE)

(72) Inventor: Andrew Derhammer, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 74 days.

(21) Appl. No.: 15/979,987

(22) Filed: May 15, 2018

(65) Prior Publication Data

US 2019/0353233 A1    Nov. 21, 2019

(51) Int. Cl.
*F16H 61/56*        (2006.01)
*F16H 41/26*        (2006.01)

(52) U.S. Cl.
CPC .............. *F16H 41/26* (2013.01); *F16H 61/56* (2013.01)

(58) Field of Classification Search
CPC .......... F16H 61/52; F16H 61/54; F16H 61/56; F16H 61/58; F16H 61/60; F16H 61/62; F16H 41/24; F16H 41/243; F16H 41/246; F16H 41/26; F16H 41/28; F16H 41/285; Y10S 74/03; Y10T 477/6353
USPC ........................... 60/342, 343, 354, 355, 356
See application file for complete search history.

(56) References Cited

U.S. PATENT DOCUMENTS

| | | | | |
|---|---|---|---|---|
| 2,909,034 | A | * | 10/1959 | Jandasek ................. F16H 61/56 60/342 |
| 2,924,941 | A | * | 2/1960 | Snoy ...................... F01D 17/162 60/354 |
| 2,944,441 | A | * | 7/1960 | Russell .................... F16H 61/56 475/37 |
| 2,944,402 | A | | 7/1961 | Russell |
| 2,999,400 | A | | 9/1961 | Kelley |
| 3,852,955 | A | | 12/1974 | Wonn et al. |
| 3,934,414 | A | * | 1/1976 | Merkle .................... F16H 61/56 60/342 |
| 3,986,356 | A | * | 10/1976 | Frotschner .............. F16H 61/52 60/342 |
| 4,009,571 | A | | 3/1977 | Black et al. |
| 4,108,290 | A | | 8/1978 | Fisher |
| 4,128,999 | A | | 12/1978 | Yokoyama et al. |
| 4,180,977 | A | | 1/1980 | Beardmore |
| 4,377,068 | A | | 3/1983 | Braatz |
| 4,848,084 | A | | 7/1989 | Wirtz |
| 5,263,319 | A | | 11/1993 | By et al. |
| 5,307,629 | A | | 5/1994 | By et al. |
| 9,784,353 | B2 | | 10/2017 | Frait et al. |

(Continued)

FOREIGN PATENT DOCUMENTS

JP            63062965 A      3/1988

*Primary Examiner* — Thomas E Lazo
*Assistant Examiner* — Dustin T Nguyen
(74) *Attorney, Agent, or Firm* — Brooks Kushman, P.C.

(57) ABSTRACT

A torque converter includes an impeller, a turbine, and a variable-pitch stator adjacent the turbine. The stator includes a hub and blades circumferentially arranged around the hub and pivotal between open and closed positions. The stator further includes an annular carrier connected to the blades and configured to rotate relative to the hub in response to pivoting of the blades, and a thrust disk engageable with the carrier to inhibit rotation of the carrier relative to the hub to maintain positions of the blades.

19 Claims, 5 Drawing Sheets

(56) References Cited

U.S. PATENT DOCUMENTS

| | | |
|---|---|---|
| 2011/0132709 A1 | 6/2011 | Fukunaga et al. |
| 2016/0047469 A1 | 2/2016 | LaVoie et al. |
| 2016/0116044 A1 | 4/2016 | Frait et al. |
| 2017/0130812 A1 | 5/2017 | Maurer et al. |
| 2017/0276244 A1 | 9/2017 | Stützinger et al. |

\* cited by examiner

VARIABLE-PITCH STATOR FOR TORQUE CONVERTER

TECHNICAL FIELD

The present disclosure relates to torque converters and more particularly to torque converters having variable-pitch stators.

BACKGROUND

Automatic transmissions may include a torque converter for coupling a transmission input shaft to a crankshaft of an engine. The torque converter includes an impeller fixed to the crankshaft, a turbine fixed to the input shaft, and a stator disposed between the impeller and the turbine. The torque converter may also include a bypass clutch that mechanically couples the transmission input shaft to the case of the torque converter, which is fixed to the crankshaft. The bypass clutch may include one or more clutch plates that rotate with the case and are interleaved with one or more disks that rotate with the input shaft. To engage the clutch, pressurized fluid forces a piston to compress the clutch plates.

The stator redirects fluid returning from the turbine so that the fluid is rotating in the same direction as the impeller. Some stators have variable-pitch blades that are controllable to alter the flow of fluid from the turbine to the impeller to tighten or loosen the torque converter.

SUMMARY

According to one embodiment, a torque converter includes a turbine and a variable-pitch stator adjacent the turbine. The stator includes a hub and blades circumferentially arranged around the hub and pivotal between open and closed positions. The stator further includes an annular carrier connected to the blades and configured to rotate relative to the hub in response to pivoting of the blades, and a thrust disk engageable with the carrier to inhibit rotation of the carrier relative to the hub to maintain positions of the blades.

According to another embodiment, a torque converter includes an impeller supported for rotation about an axis, a turbine supported for rotation about the axis, and a variable-pitch stator. The stator includes a hub having a radially extending first face, blades circumferentially arranged around the hub and each pivotal between open and closed positions, and an annular carrier disposed on the hub and having a radially extending second face engageable with the first face. The carrier is connected to the blades and is configured to rotate relative to the hub about the axis in response to pivoting of the blades. Each of the blades are biased to the closed position and are configured to pivot to the open position in response to fluid exiting the turbine overcoming the bias. The first and second faces are configured to frictionally engage to resist rotation of the carrier relative to the hub in response to axial movement of the turbine towards the impeller.

According to yet another embodiment, a torque converter includes an impeller, a turbine, and a variable-pitch stator interposed between the impeller and the turbine. The stator includes an outer ring, a hub, and a blade-crank assembly having an annular carrier disposed on the hub and a plurality of cranks circumferentially arranged around the hub. Each crank has an arm attached to the carrier and a shaft extending radially through hub and the outer ring. Blades are disposed between the hub and the outer ring with each of the blades being fixed on a corresponding one of the shafts such that each shaft extends radially along a corresponding one of the blades at a location that is offset from a centerline of that blade to give that blade an off-axis pivot point extending through the corresponding shaft. The cranks are rotatable relative to the hub and the outer ring to pivot the blades between open and closed positions. Rotation of the cranks rotates the carrier about the hub between a first position corresponding to the blades being in the closed position and a second position corresponding to the blades being in the open position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
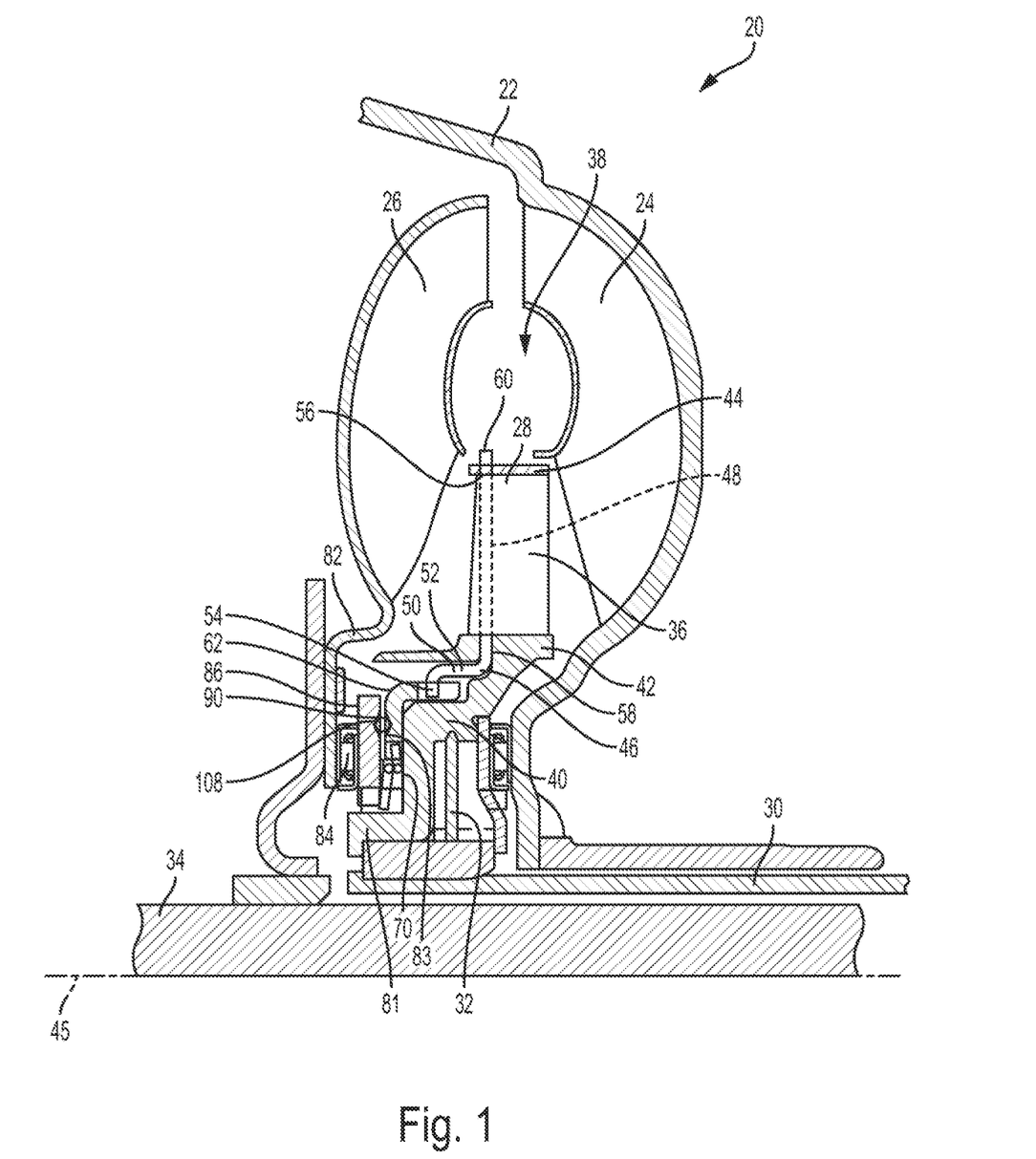
FIG. 1 is a schematic cross-sectional view of a torque converter.

Referring to FIG. 1, a vehicle includes an automatic transmission coupled to a powerplant, e.g., an engine, by a torque converter 20. The torque converter 20 includes a case 22 fixed to a crankshaft of the engine. An impeller 24 is fixed to the case 22 and rotates with the crankshaft. A turbine 26 is disposed adjacent to the impeller 24 within a hydrodynamic chamber 38 of the torque converter 20 and is connected, e.g., splined, to a turbine shaft 34 that supplies power to the transmission. A torsional damper may be interposed between turbine 26 and the turbine shaft 34 to isolate the transmission and other driveline components from engine vibrations.

A stator 28 is coupled to a stator shaft 30 by a one-way clutch 32. The stator shaft 30 is fixed to a front support of the transmission and is stationary relative to the torque converter 20. When the turbine shaft 34 is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force causing the torque on the turbine 26 to be greater than the torque on the impeller 24. When the speed of the turbine 26 approaches that of the impeller 24, fluid tends to flow around the centerline of the torque converter, causing the one-way clutch 32 of the stator 28 to overrun.

Power flow through the hydrodynamic power flow path is governed by the speed of the impeller 24 and the speed of the turbine 26. The relationship between the speeds and the torques is a function of torus geometry and blade angles of the impeller, turbine and stator. At a constant turbine speed, both the impeller torque and the turbine torque increase as impeller speed increases. A torque converter designed to exert a higher resistance torque on the impeller at a given impeller and turbine speed is called a stiffer or tighter converter, whereas a torque converter designed to exert a lower torque for the same impeller and turbine speed is called a looser torque converter. The tightness of a torque converter may be expressed as a K-factor that relates the impeller torque to the impeller speed. A low K-factor indicates a tight converter while a high K-factor indicates a loose converter. The ratio of the turbine torque to impeller torque (torque ratio) generally decreases as the ratio of turbine speed to impeller speed (speed ratio) increases. The product of the speed ratio and the torque ratio is the converter efficiency, which varies between zero and one as a function of impeller speed and turbine speed.

A loose torque converter is desirable when the vehicle is stopped to reduce load on the engine thereby improving fuel economy and reducing vibrations. A loose torque converter may also be desirable for improving the performance of turbocharged engines as it allows the turbochargers to spool up more quickly by allowing the engine to flare. A loose converter may also be desirable when a driver is requesting high acceleration to increase engine speed thereby operating the engine where it generates more power. A tighter torque converter may be desirable to reduce engine speeds to improve efficiency when high acceleration is not required. In typical fixed stators, a compromise K-factor is chosen to balance the competing goals of operating the engine at lower speeds where the engine is more efficient, i.e., a tighter state, and operating the engine at higher speeds where the engine produces more power, i.e., a looser state.

It may be desirable to have a torque converter in which the K-factor may be adjusted to optimize the torque converter in different operating conditions. The K-factor may be adjusted by modifying a pitch of the blades 36 of the stator 28. Generally, the torque converter becomes looser by closing the blades of the stator, i.e., reducing fluid flow area through the stator, and becomes tighter by opening the blades of the stator i.e., increasing fluid flow area through the stator.

The stator 28 includes an annular hub 40 supported on the stator shaft 30 and selectively fixed to the stator shaft 30 by the one-way clutch 32. The blades 36 are circumferentially arranged around an outer rim 42 of the hub 40 and extend radially outward from the hub 40. The stator 28 also includes an outer ring 44 that circumscribes the hub 40. The blades 36 are radially disposed between the outer ring 44 and the hub 40.

Figure 2:
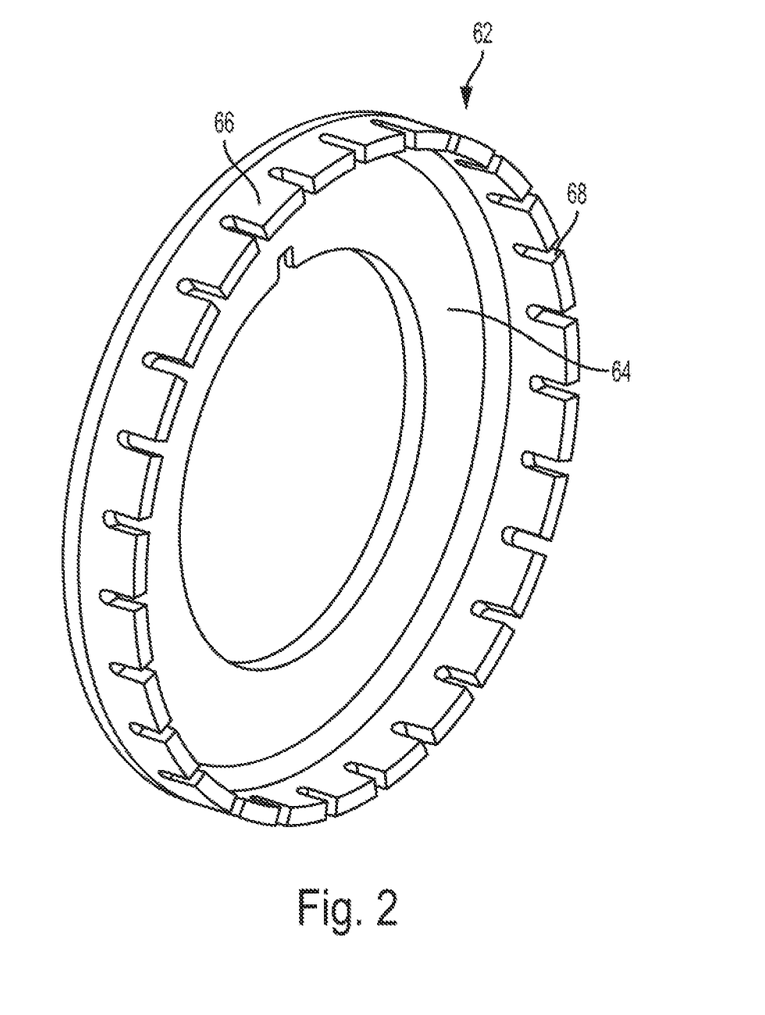
FIG. 2 is a perspective view of a carrier of the torque converter.

Referring to FIGS. 1 and 2, each of the blades 36 may include a crank 46 having a shaft 48 forming a pivot axis of the blade 36 and an arm 50 extending from the shaft 48 so that the arm 50 is offset from the pivot axis. Each of the arms 50 may include a first portion 52 that extends outwardly from the shaft 48 and a second portion 54 that extends radially inward from the first portion. The second portion 54 may be substantially parallel to the shaft 48 and offset from the pivot axis. The outer ring 44 may define a plurality of holes 56 and the outer rim 42 may define slots 58. The holes 56 and slots 58 are circumferentially arranged around the stator 28 and are radially aligned with each other. Each crank 46 is disposed in corresponding ones of the holes 56 and the slots 58 with a distal end 60 of the crank 46 received in a corresponding hole 56 and with the shaft 48 extending through a corresponding slot 58. The cranks 46 are rotatable within the holes 56 and slots 58 to modify the pitch of the blades 36. Each of blades are pivotal between an open position, a closed position, and a range of intermediate positions. The blades 36 may be designed to rotate in unison. The open position corresponds to a tightest condition of the torque converter 20 and the closed position corresponds to a loosest condition. The blades may not fully open, i.e., parallel to the centerline 45, or fully close, i.e., perpendicular to the centerline.

The stator 28 includes a blade-crank carrier 62 disposed within the hub 40 radially inboard of the outer rim 42. The carrier 62 may be annular and include a face portion 64 and a ring portion 66. The ring portion 66 defines a plurality of circumferentially arranged openings 68 each configured to receive one of the cranks 46. The carrier 62 secures the second portions 54 of the cranks 46 and ensures that the cranks 46 are uniformly actuated so that the blades 36 have substantially same pitches. The carrier 62 is rotatable relative to the hub 40 and rotates in response to the blades 36 being pivoted due to the second portions 54 being offset from the shafts 48.

Figure 6:
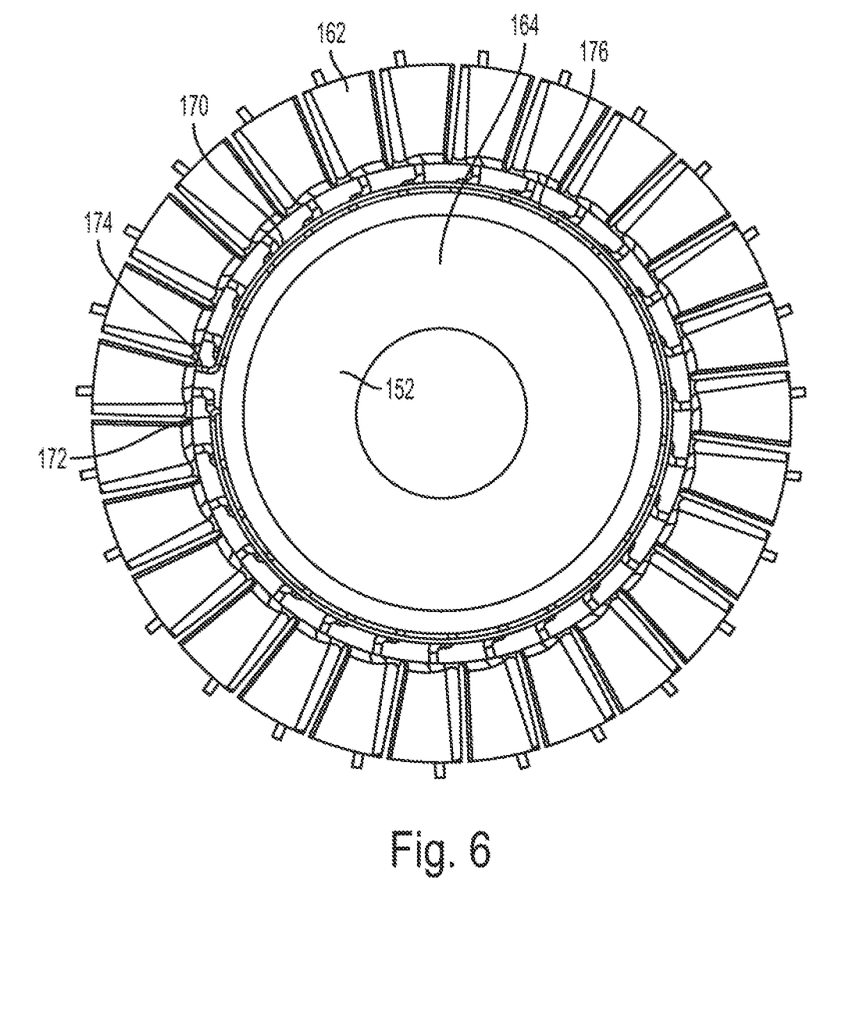
FIG. 6 is a partial front view of a stator of the torque converter shown in FIG. 5.

The blades 36 may be biased to their closed position. For example, the carrier 62 may be biased in a first rotational direction relative to the hub 40 to bias the blades 36 to their closed position. The carrier 62 may be biased by a resilient member 70. The resilient member 70 may be a torsional spring that acts between the hub 40 and the carrier 62 and urges the carrier 62 in the first direction. A first end of the resilient member 70 may be attached to the hub 40 and a second end of the resilient member 70 may be attached to the carrier 62. (A better view of one type of torsional spring is shown in FIG. 6.)

The resilient member 70 biases the blades 36 to their closed position when the engine is at idle speed to improve fuel economy. As engine speed increases, the force of the fluid leaving the turbine and contacting the blades increases and eventually overcomes the spring bias causing the blades to move towards their open position and the carrier 62 to rotate in a second rotational direction. The shafts 48 may be mounted to the blades 36 at a location that is offset from a centerline of the blades 36 in a forward direction to give the blades off-axis pivot points. Placing the pivot axis towards the forward edge 78 reduces the fluid force needed to pivot the blade 36 toward the open position. When the fluid force diminishes below a threshold, the resilient member 70 returns the blades to the closed position.

Relying solely on fluid force to operate the pitch of the blades 36 may result in blade flutter, i.e. unintentional back-and-forth pivoting of the blades, during certain speed ranges of the torque converter. To reduce the possibility of flutter, the torque converter 20 includes a thrust disk 80 that engages with the carrier 62 to rotationally lock the carrier 62 to the hub 40. The thrust disk 80 may be seated on an inner portion 81 of the hub 40 so that the thrust disk 80 is rotationally fixed to the hub 40 but is axially movable. For example, the thrust disk 80 may be splined to the hub 40. The thrust disk 80 is disposed between a shell 82 of the turbine 26 and a front side 83 of the carrier 62. A thrust bearing 84 is disposed between the shell 82 and the thrust disk 80. The bearing 84 transfers axial forces between the turbine shell 82 and the thrust disk 80 while facilitating independent rotation between the turbine 26 and the thrust disk 80.

During operation of the torque converter 20, fluid movement within the hydrodynamic chamber 38 pulls the turbine 26 towards the impeller 24. The magnitude of the pull is dependent upon the speed of the impeller 24. The pull increases as impeller speed increases. For example, at idle speed there may be less than 500 Newtons (N) pulling the turbine 26 towards the impeller 24, but this may increase above 1,500 N by 2,000 RPMs. This force urges the turbine 26 towards the impeller 24 driving the thrust disk 80 into engagement with the carrier 62 to restrain the blades 36 from fluttering. In some embodiments, the thrust disk 80 may frictionally engage with the carrier 62 to resist rotation of the carrier 62, or the thrust disk 80 and carrier 62 may be combined and frictionally engage with the hub 40. Alternatively, and as illustrated in FIG. 1, a ball-ramp mechanism 90 may be used to rotationally fix the carrier 62 to the thrust disk 80.

Figure 3:
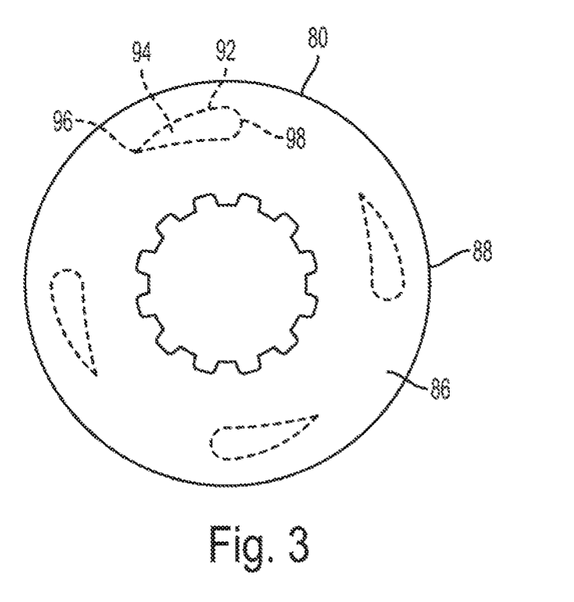
FIG. 3 is a front view of a thrust disk of the torque converter.
Figure 4:
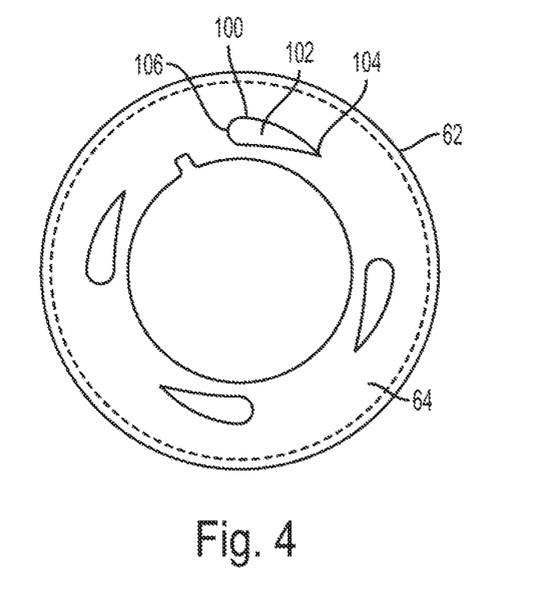
FIG. 4 is a front view of the carrier.

Referring to FIGS. 1, 3, and 4, the thrust disk 80 may include opposing front and back radial faces 86 and 88. The back face 88 of the thrust disk 80 defines one or more first ball-ramp grooves 92 having a ramped bottom surface 94 varying in depth between a shallow portion 96 and a deep portion 98. The face portion 64 of the carrier 62 defines one or more second ball-ramp grooves 100 that have a ramped bottom surface 102 varying in depth between a shallow portion 104 and a deep portion 106. The first and second ball-ramp grooves 92, 100 may be substantially identical in shape and are radially positioned so that at least a portion of one of the first grooves 92 is disposed over a corresponding one of the second grooves 100. Each groove pair includes a ball 108 interposed therebetween and at least partially received in the groove 92 and the groove 100. In the illustrated embodiment, each of the thrust disk 80 and the carrier 62 defines four grooves with each of the grooves receiving one of the four balls 108. In other embodiments, more or less than four grooves may be provided.

Rotation of the carrier 62 relative to the thrust disk 80 causes the balls 108 to roll along their respective ramped surfaces. Since the grooves 92, 100 vary in depth, the axial separation (gap) between the thrust disk 80 and the carrier 62 changes depending upon the position of the balls 108 in their respective grooves. The gap between the thrust disk 80 and the carrier 62 is smallest when the balls 108 are located within the deep portions 98, 106 and is largest when the balls 108 are located within the shallow portions 96, 104.

The stator 28 is designed so that the balls 108 are located in the shallow portions 96, 104 when the blades are in their closed position, which corresponds with the carrier 62 being in the first radial position. During torque-converter operation above a threshold speed, the blades 36 pivot towards their open position causing the carrier 62 to rotate relative the thrust disk 80 in the second direction, which in turn causes the balls 108 to roll towards the deep portions 98, 106. Simultaneously, suction force moves the thrust disk 80 towards the carrier 62 driving the balls 108 against the ramped surface 102 of the carrier 62. This driving force in combination with the inward slope of ramped surface 102 further urges the balls 108 towards the deep portions 106 facilitating pivoting of the blades to their open position. Inclusion of the ball-ramp mechanism 90 may decrease transition time of the blades between their open and closed positions and encourages two-position operation of the blades 36, i.e. the blades 36 rarely remain in an intermediate position for an extended period of time. Intermediate blade positions may be desirable in some applications and the ball ramps can be designed to achieve this or may be omitted.

Figure 5:
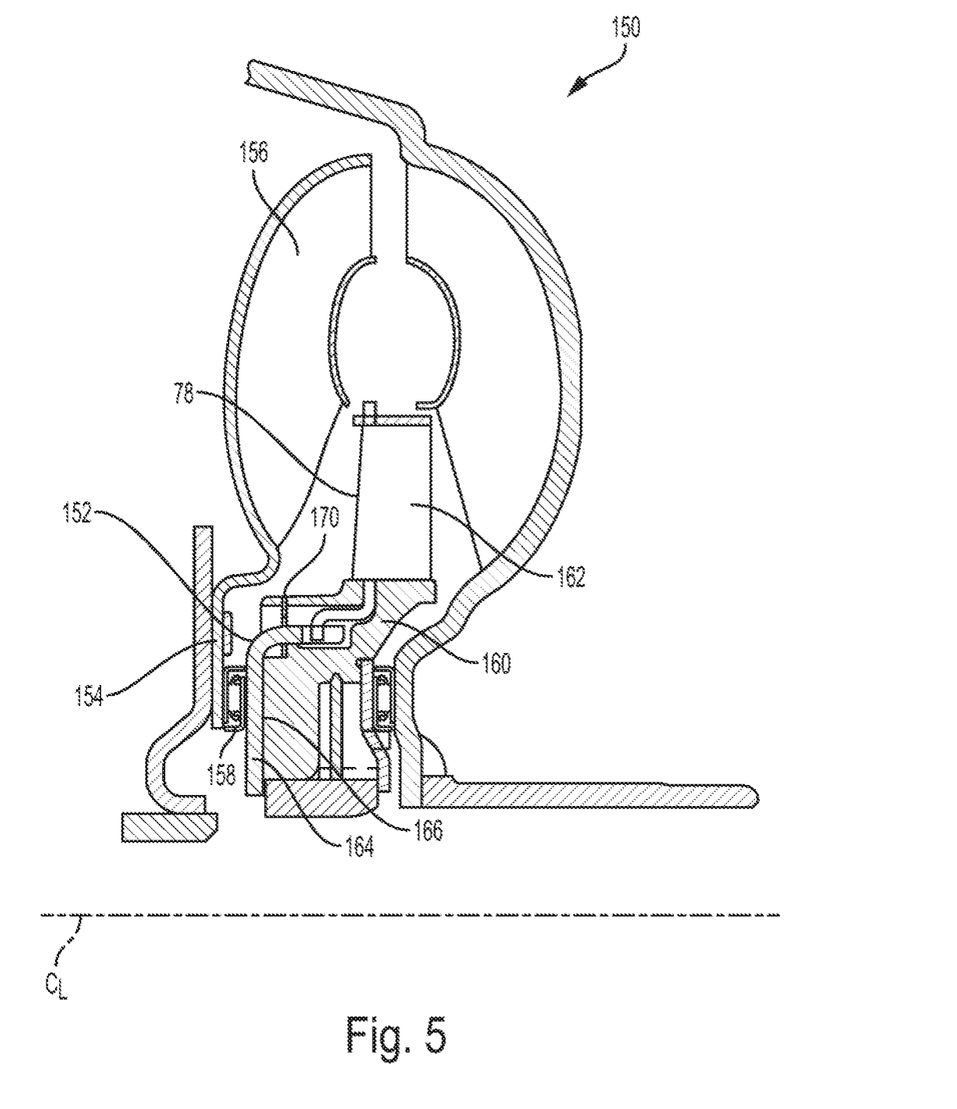
FIG. 5 is a schematic cross-sectional view of another torque converter.

Referring to FIGS. 5 and 6, another torque converter 150 is shown that may include components common with the torque converter 20. In the interest of brevity, some of the components common between torque converter 150 and torque converter 20 are not discussed again. The torque converter 150 omits the thrust plate in lieu of an enlarged blade-crank carrier 152 that is adjacent to a shell 154 of the turbine 156. A thrust bearing 158 is disposed between the shell 154 and the carrier 152 to transfer axial movement of the turbine 156 into the carrier 152.

The carrier 152 is rotatably seated on a stator hub 160 and, like above, is rotatable about the hub 160 in response to the stator blades 162 pivoting between their open and closed positions. The carrier 152 includes a radially extending face 164 that is adjacent to a radially extending front face 166 of the hub 160. The faces 164 and 166 are configured to frictionally engage with each other to resist rotation of the carrier 152 relative to the hub 160 in response to axial movement of the turbine 156 towards the hub 160. The operation of the torque converter 150 is similar to torque converter 20 except that the carrier 152 is frictionally engaged with the hub 160 as opposed to the torque converter 20 in which the carrier 62 frictionally engages with the thrust disk 80.

The carrier 152 is biased by a resilient member 170. The resilient member may be a torsional spring having a first end 172 attached to the hub 160, a second end 174 attached to the carrier 152, and an annular segment 176 extending between the ends 172, 174. Like above, the resilient member 170 biases the carrier 152 in a first rotational direction to bias the blades 162 to their closed positions. The blades 162 pivot toward their open position when the fluid force exceeds the bias of the resilient member 170.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A torque converter comprising:
   a turbine; and
   a variable-pitch stator adjacent the turbine, the stator including:
   a hub,
   blades circumferentially arranged around the hub and pivotal between open and closed positions,
   an annular carrier connected to the blades and configured to rotate relative to the hub in response to pivoting of the blades, and
   a thrust disk engageable with the carrier to inhibit rotation of the carrier relative to the hub to maintain positions of the blades.

2. The torque converter of claim 1, wherein the carrier, the hub, and the thrust disk are concentric.

3. The torque converter of claim 2, wherein the thrust disk is rotationally fixed to the hub.

4. The torque converter of claim 1, wherein the carrier is connected to the blades by cranks.

5. The torque converter of claim 4, wherein each of the cranks has a shaft and an arm, wherein the shaft extends through the hub and the arm is connected to the carrier, wherein the shaft forms a pivot axis of the blade, and the arm is offset from the shaft such that rotation of the shaft moves the arm to rotate the carrier.

6. The torque converter of claim 1, wherein the stator further includes a ball-ramp mechanism having a first groove defined in the carrier, a second groove defined in the thrust disk, and a ball interposed between the carrier and the thrust disk and received in the first and second grooves.

7. The torque converter of claim 1 further comprising an impeller, wherein the stator is interposed between the impeller and the turbine.

8. The torque converter of claim 1, wherein the stator further includes a resilient member disposed in the hub and biasing the carrier in a first rotational direction to bias each of the blades to a first position.

9. The torque converter of claim 8, wherein the resilient member is a torsional spring.

10. The torque converter of claim 8, wherein each of the blades pivot to a second position in response to fluid exiting the turbine overcoming the bias of the resilient member.

11. A torque converter comprising:
an impeller supported for rotation about an axis;
a turbine supported for rotation about the axis; and
a variable-pitch stator including:
a hub including a radially extending first face,
blades circumferentially arranged around the hub and each pivotal between open and closed positions, and
an annular carrier disposed on the hub and having a radially extending second face engageable with the first face, the carrier being connected to the blades and configured to rotate relative to the hub about the axis in response to pivoting of the blades, wherein each of the blades are biased to the closed position and are configured to pivot to the open position in response to fluid exiting the turbine overcoming the bias, and wherein the first and second faces are configured to frictionally engage to resist rotation of the carrier relative to the hub in response to axial movement of the turbine towards the impeller.

12. The torque converter of claim 11, wherein the stator further includes a resilient member disposed in the hub and biasing the carrier in a first rotational direction to bias each of the blades to the closed position.

13. The torque converter of claim 12, wherein the resilient member includes a first end attached to the carrier, a second end attached to the hub, and an annular segment extending therebetween.

14. The torque converter of claim 13, wherein the resilient member is a torsional spring.

15. A torque converter comprising:
an impeller;
a turbine axially movable relative to the impeller; and
a variable-pitch stator interposed between the impeller and the turbine, and including:
an outer ring,
a hub,
a blade-crank assembly having an annular carrier disposed on the hub and a plurality of cranks circumferentially arranged around the hub, each crank including an arm attached to the carrier and a shaft extending radially through the hub and the outer ring,
blades disposed between the hub and the outer ring, each of the blades being fixed on a corresponding one of the shafts such that each shaft extends radially along a corresponding one of the blades at a location that is offset from a centerline of that blade to give that blade an off-axis pivot point extending through the corresponding shaft, wherein the cranks are rotatable relative to the hub and the outer ring to pivot the blades between open and closed positions, and wherein rotation of the cranks rotates the carrier about the hub between a first position corresponding to the blades being in the closed position and a second position corresponding to the blades being in the open position, and
a thrust plate driven by the turbine and engageable with the carrier to inhibit rotation of the carrier relative to the hub.

16. The torque converter of claim 15, wherein the stator further includes a resilient member biasing the carrier towards the first position.

17. The torque converter of claim 15, wherein the turbine is axially movable relative to the impeller, and the variable-pitch stator further includes a thrust plate driven by the turbine and engageable with the carrier to lock the carrier in the second position in response to axial movement of the turbine towards the impeller.

18. The torque converter of claim 15, wherein the variable-pitch stator further includes a thrust plate rotationally fixed to the hub and adjacent to the carrier, and a ball-ramp mechanism having a first groove defined in the carrier, a second groove defined in the thrust plate, and a ball interposed between the carrier and the thrust plate and received in the first and second grooves.

19. The torque converter of claim 18, wherein each of the grooves have variable depth ranging from a shallow portion to a deep portion, and wherein the ball is disposed in the deep portion when the carrier is in the second position.

* * * * *